(12) United States Patent
Chamberlin et al.

(10) Patent No.: US 9,450,468 B2
(45) Date of Patent: *Sep. 20, 2016

(54) L-SHAPED SHEET METAL COOLING JACKET WITH BAFFLES AND INTEGRATED POWER ELECTRONICS

(71) Applicant: Remy Technologies, LLC, Pendleton, IN (US)

(72) Inventors: Bradley D. Chamberlin, Pendleton, IN (US); David Fulton, Anderson, IN (US); James Ramey, Fortville, IN (US)

(73) Assignee: Remy Technologies, LLC, Pendleton, IN (US)

( * ) Notice: Subject to any disclaimer, the term of this patent is extended or adjusted under 35 U.S.C. 154(b) by 27 days.

This patent is subject to a terminal disclaimer.

(21) Appl. No.: 13/827,061

(22) Filed: Mar. 14, 2013

(65) Prior Publication Data
US 2014/0265670 A1    Sep. 18, 2014

(51) Int. Cl.
*H02K 5/20* (2006.01)
*H02K 9/19* (2006.01)
*H02K 9/00* (2006.01)

(52) U.S. Cl.
CPC ........ *H02K 5/20* (2013.01); *H02K 9/19* (2013.01); *H02K 11/33* (2016.01); *H02K 9/00* (2013.01); *Y10T 29/49002* (2015.01)

(58) Field of Classification Search
CPC ............. H02K 5/20; H02K 9/00; H02K 9/19
USPC ................................................ 310/52–64, 89
See application file for complete search history.

(56) References Cited

U.S. PATENT DOCUMENTS

| | | | | |
|---|---|---|---|---|
| 5,491,371 A | * | 2/1996 | Ooi ............................... | 310/58 |
| 5,798,586 A | * | 8/1998 | Adachi .................... | H02K 5/20 310/54 |
| 6,160,332 A | * | 12/2000 | Tsuruhara ........................ | 310/54 |
| 6,175,171 B1 | * | 1/2001 | Rupp et al. ...................... | 310/52 |

* cited by examiner

*Primary Examiner* — Dang Le
(74) *Attorney, Agent, or Firm* — Bose McKinney & Evans LLP

(57) ABSTRACT

An electric machine includes a pair of substantially aligned sheet metal housing sections each including a substantially "L" shaped portion, at least one cooling channel being formed at an axial end between the two sections, and a plurality of power electronics components engaged with at least one of the housing sections adjacent the axial end cooling channel. An embodiment includes a stator, a pair of housing sections enclosing the stator, power electronics components positioned at an axial end of the electric machine for controlling operation of the electric machine, and a coolant flow path that includes a power electronics cooling channel formed at the axial end between the housing sections. A method includes forming an axial end cooling channel between two sheet metal housing sections, and positioning power electronics components at the axial end along the cooling channel, whereby heat from the electronics components is transferred to the cooling channel.

23 Claims, 15 Drawing Sheets

L-SHAPED SHEET METAL COOLING JACKET WITH BAFFLES AND INTEGRATED POWER ELECTRONICS

REFERENCE TO RELATED APPLICATIONS

The present application is related to U.S. patent application Ser. Nos. 13/826,673; 13/826,868; 13/827,323; and 13/827,603, each of which was filed Mar. 14, 2013.

BACKGROUND

The present invention is directed to increasing performance and efficiency of an electric machine and, more particularly, to decreasing machine size while improving the machine's heat rejection.

An electric machine is generally structured for operation as a motor and/or a generator, and may have electrical windings and/or permanent magnets, for example in a rotor and/or in a stator. Heat is produced in the windings and magnets, and by bearings or other sources of friction. Eddy currents and core losses occur. In a densely packed electric machine operating at a high performance level, excessive heat may be generated. Such heat must be removed to prevent it from reaching impermissible levels that may cause damage and/or reduction in performance or life of the motor.

Various apparatuses and methods are known for removing heat. One exemplary method includes providing the electric machine with a water jacket having fluid passages through which a cooling liquid, such as water, may be circulated to remove heat. Another exemplary method may include providing an air flow, which may be assisted with a fan, through or across the electric machine to promote cooling. A further exemplary method may include spraying or otherwise directing oil or other coolant directly onto end turns of a stator winding.

There is generally an ongoing need for increasing performance and efficiency of electric machines, such by providing more power in a smaller space. Although various structures and methods have been employed for housing and cooling an electric machine, improvement remains desirable.

SUMMARY

It is therefore desirable to obviate the above-mentioned disadvantages by providing a machine construction that minimizes size and maximizes heat rejection to assure increased efficiency and reliability.

According to an exemplary embodiment, an electric machine includes a pair of substantially aligned sheet metal housing sections each including a substantially "L" shaped portion, at least one cooling channel being formed at an axial end of the electric machine between the two sections, and a plurality of power electronics components engaged with at least one of the housing sections adjacent the axial end cooling channel.

According to another exemplary embodiment, an electric machine includes a stator, a pair of housing sections enclosing the stator, power electronics components positioned at an axial end of the electric machine for controlling operation of the electric machine, and a coolant flow path that includes a power electronics cooling channel formed at the axial end between the housing sections.

According to a further exemplary embodiment, a method includes forming an axial end cooling channel between two sheet metal housing sections, and positioning power electronics components at the axial end along the cooling channel, whereby heat from the electronics components is transferred to the cooling channel.

The foregoing summary does not limit the invention, which is defined by the attached claims. Similarly, neither the Title nor the Abstract is to be taken as limiting in any way the scope of the claimed invention.

BRIEF DESCRIPTION OF THE DRAWING FIGURES

The above-mentioned aspects of exemplary embodiments will become more apparent and will be better understood by reference to the following description of the embodiments taken in conjunction with the accompanying drawings, wherein.

Corresponding reference characters indicate corresponding or similar parts throughout the several views.

DETAILED DESCRIPTION

The embodiments described below are not intended to be exhaustive or to limit the invention to the precise forms disclosed. Rather, the embodiments are chosen and described so that others skilled in the art may appreciate and understand the principles and practices of these teachings.

Figure 1:
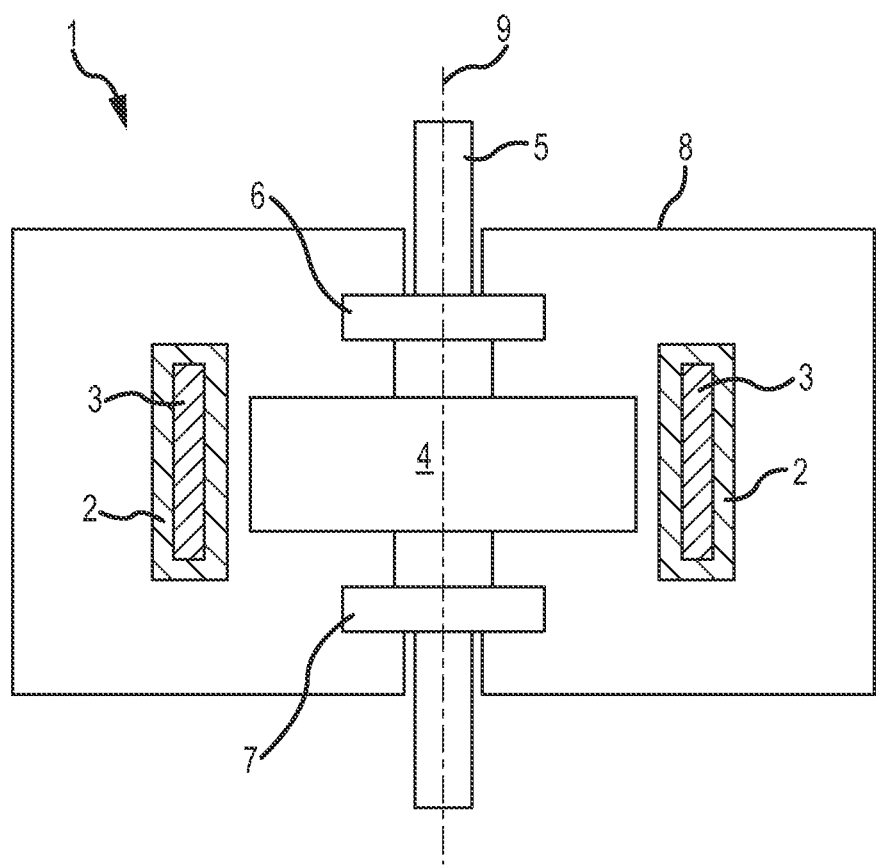
FIG. 1 is a schematic view of an exemplary electric machine.

FIG. 1 is a schematic view of an exemplary electric machine 1 having a stator 2 that includes stator windings 3 such as one or more coils. An annular rotor body 4 may also contain windings and/or permanent magnets and/or conductor bars such as those formed by a die-casting process. Rotor body 4 is part of a rotor that includes an output shaft 5 supported by a front bearing assembly 6 and a rear bearing assembly 7. Bearing assemblies 6, 7 are secured to a housing 8. Typically, stator 2 and rotor body 4 are essentially cylindrical in shape and are concentric with a central longitudinal axis 9. Although rotor body 4 is shown radially inward of stator 2, rotor body 4 in various embodiments may alternatively be formed radially outward of stator 2. Electric machine 1 may be an induction motor/generator or other device. In an exemplary embodiment, electric machine 1 may be a traction motor for a hybrid or electric type vehicle. Housing 8 may have a plurality of fins (not shown) formed to be spaced from one another on a housing external surface for dissipating heat produced in the stator windings 3.

Figure 2:
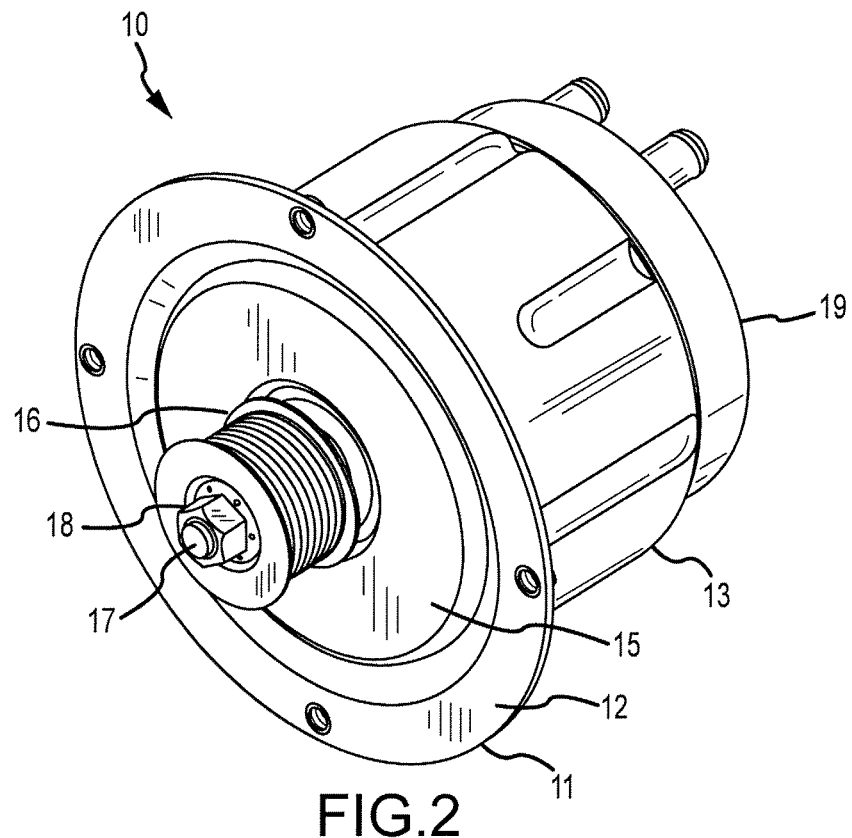
FIG. 2 and FIG. 3 are respective front and rear perspective views of an electric machine, according to an exemplary embodiment.
Figure 3:
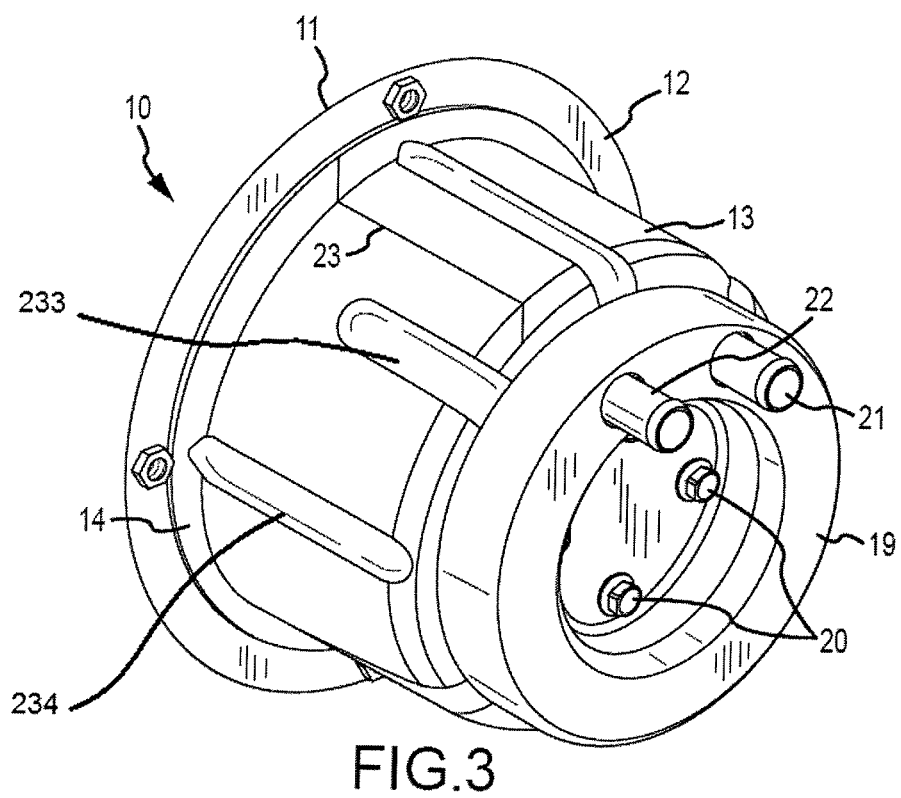

FIG. 2 and FIG. 3 are respective front and rear perspective views of an electric machine 10, according to an exemplary embodiment. A first housing member 11 has an annular flanged portion 12 adapted for mounting electric machine 10, for example in an electric vehicle. The axially extending portion of first housing member 11 is covered by a second housing member 13. An annular flange portion 14 of housing member 13 is formed to be contiguous with flange 12. A front cover 15 has an axial end portion and has an axially extending portion that is enclosed by housing members 11, 13. A pulley 16 is attached to a drive shaft 17 with a nut 18 or other fastening structure. A rear cover 19 is secured to the rear axial end of electric machine 10 with bolts 20 or other suitable fastening structure. A coolant input tube 21 and a coolant output tube 22 extend from an interior coolant system through rear cover 19. Housing sections 11, 13 may each be formed of sheet metal that is stamped into shape. For example, housing member 13 may be formed as a single sheet that is wrapped around housing member 11 and joined together at a seam 23. Although described with pulley 16, a given embodiment may alternatively utilize a female spline formed in shaft 17 instead of a pulley. Outer housing section 13 includes baffles 233, 234, discussed below.

Figure 4A:
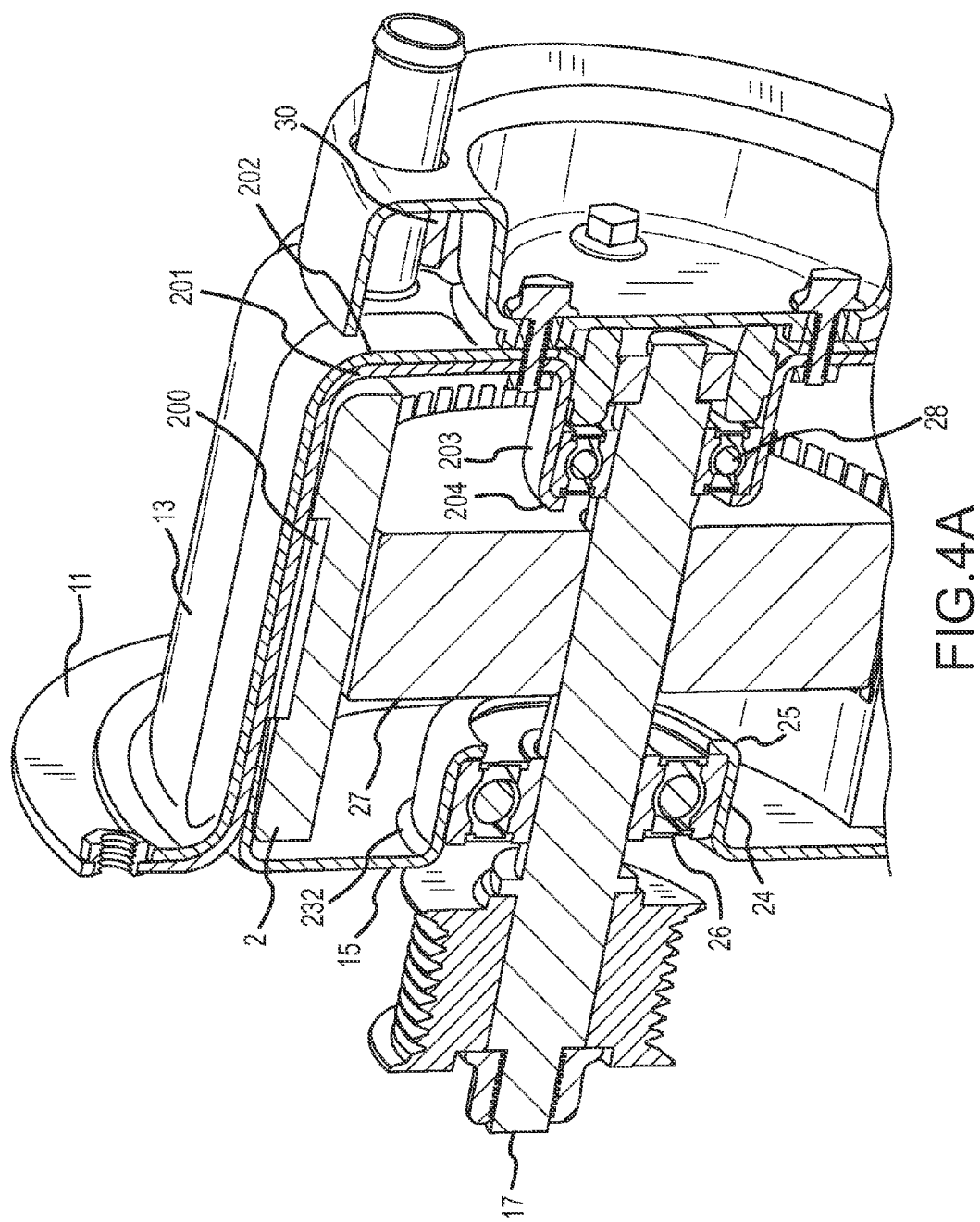
FIG. 4A is a partial sectional perspective view and FIG. 4B is a sectional elevation view of an electric machine, according to an exemplary embodiment.
Figure 4B:
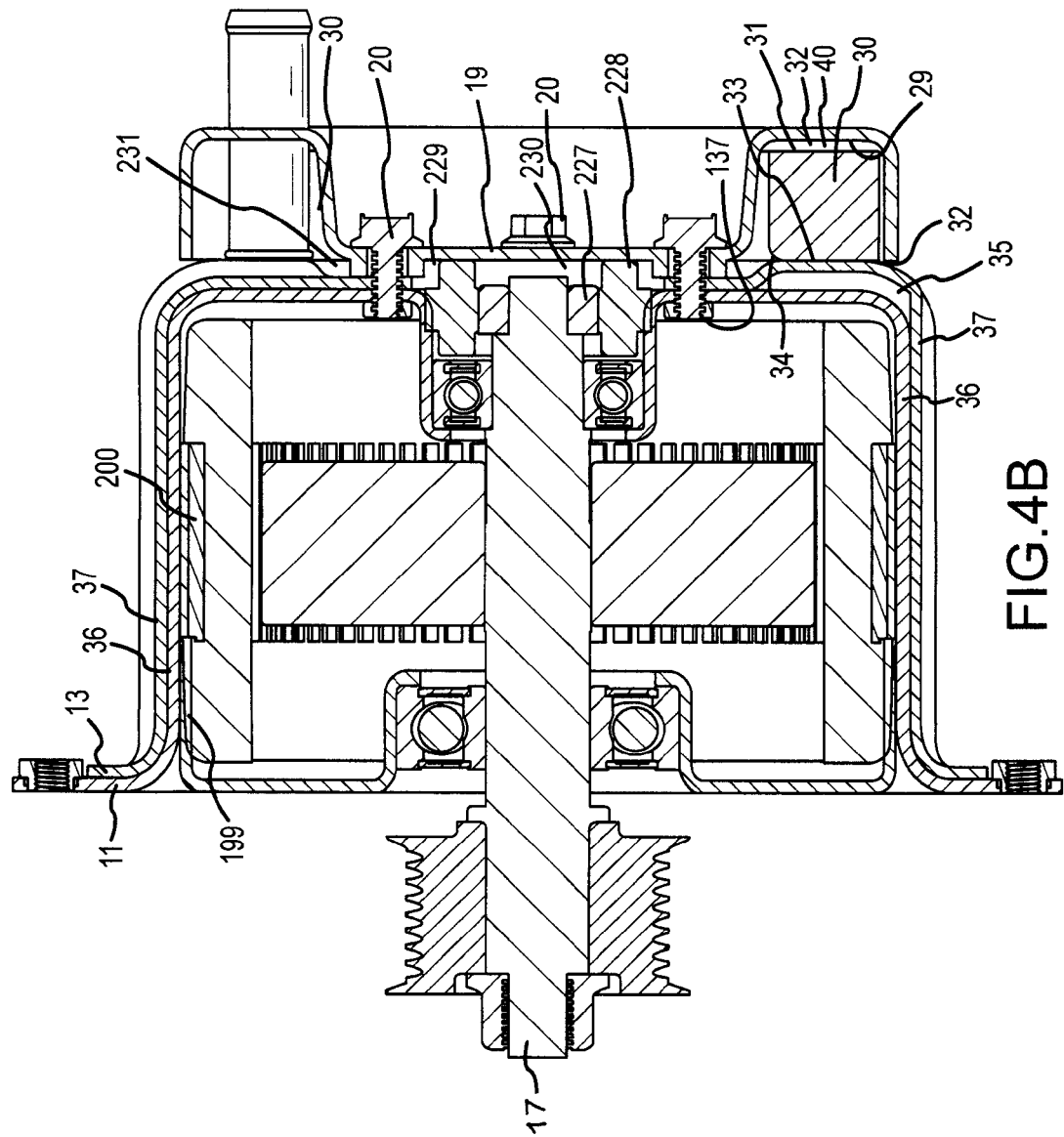

FIG. 4A is a partial sectional perspective view and FIG. 4B is a sectional elevation view of an exemplary electric machine 10. Housing sections 11, 13 may be sheet metal components each having an "L" shaped profile. Housing sections 11, 13 are formed to have a substantially same annular shape so that when they are attached together they effect an annular housing configuration having one or more cooling channels/jackets 35 between portions of the two housing sections 11, 13. For example, inner housing section 11 may be attached to outer housing section 13 by any appropriate process, such as by brazing, soldering, welding, crimping, bolting, staking, using adhesives, sealant, and/or gaskets, or by other operations. The axially extending portion 36 of housing section 11 is attached to the axially extending portion 37 of housing section 13.

Coolant may be circulated through one or more channels/cavities 35 formed between housing sections 11, 13. For example, attached portions of housing sections 11, 13 that enclose cooling channels 35 act as coolant seals that prevent leakage from such coolant channels 35. Individual channels 35 may be joined together in any series or parallel arrangement. A channel 35 may have baffles formed by stamping a baffle pattern into one or both of housing sections 11, 13. For example, outer housing section 13 may have features embossed therein that cause the flowing coolant to circulate in an "S" shaped pattern. The coolant flow may be distributed through both portions of the "L" shaped sheet metal construction (e.g., the axially and radially extending portions). Alternatively, baffles may be provided as a separate structure inserted into a given coolant channel 35. In various embodiments, the embossments may be created to cause the flowing coolant to circulate in other patterns, such as circumferentially on both an axial end as well as in the radial portion of the housing circumscribing stator 2. As the respective short legs of the "L" shape, radially extending portions 201, 202 are joined together in areas surrounding channels 35, thereby forming boundaries to contain the coolant in axial end cooling channels 35. Cooling channel(s) 35 may be fluidly connected to a cooling jacket 200 circumscribing stator 2.

In an exemplary embodiment, power electronics 30 are assembled into cover 19 before installing the electronics/cover assembly directly to the rear axial end of machine 10. For example, electronics 30 may have a heat transfer surface 31 mounted to an axially inward surface 29 of end cover 19. Alternatively, power electronics 30 may be mounted to housing surface 33 and cover 19 later attached. As the respective long legs of the "L" shape, the axially extending portion 36 of housing section 11 is attached to the axially extending portion 37 of housing section 13.

Front cover 15 has an annular inner axially extending portion 24 and an annular inner radially extending portion 25 structured for securing a front bearing assembly 26 having a rotating portion fitted to shaft 17. At a radially outer periphery, front cover 15 has an annular, axially extending rim 199 fitted within axially extending portion 36 of housing section 11. A rotor core 27 is secured to a middle portion of shaft 17 and the rotating portion of a rear bearing assembly 28 is secured to the rear portion of shaft 17. Rear cover 19 houses and protects power electronics 30 of electric machine 10. Rear cover 19 may be formed of aluminum, steel, plastic, or any of a variety of composite materials, and may be attached to the rear axial end of electric machine 10 by fasteners 20 or by other suitable attachment structure. Inner housing section 11 has an annular inner axially extending portion 203 and an annular inner radially extending flange portion 204 structured for securing a rear bearing assembly 28 having a rotating portion fitted to shaft 17. In various embodiments, a separate bearing carrier (not shown) may be used in one or more bearing assemblies therein, and/or additional material thickness, welds, or other structure may be added to an otherwise consistent material of cover 15 and/or inner housing 11, respecting portions where additional material strength is required for providing stable and reliable support of respective bearing assemblies 26, 28. For example, a weld bead or the like may be placed at the apex 232 of cover 15. In various embodiments, the bearing support portion of housing section 11 together with bearing assembly 28 may constitute a complete bearing carrier. In particular, support structure for bearings may include housing section 11, in whole or in part. Alternatively, a separate bearing carrier may be used at any bearing location, and may include bearings, seals, grease fittings, and at least some support structure.

Bearing assemblies 26, 28 may take any appropriate form for a given application and are described herein by example to include any bearings rotationally supporting the axially-directed shaft 17. Structure of annular bearing supports for assemblies 26, 28 is formed integrally in the stamping of sheet metal portions 11, 13, 15 that define a motor case enclosing stator assembly 2 and rotor assembly 4. For example, ball bearings may be held in a bearing carrier configured to be radially and/or axially registered/aligned with housing 11 and/or stator assembly 2. In an exemplary embodiment, sheet metal having a nominal thickness of 2-3 mm may be used for forming bearing supports. Shape and composition of materials at the apex of the "L" portion, and in axially extending portion 203 and/or radially extending housing portion 204, may be modified to provide additional strength in securing bearing assembly 28, in forming one or more keys or other structure (not shown) for preventing relative rotation of the non-rotating portion of bearing assembly 28, for mechanically directing the heat flow in the vicinity of bearing assembly 28, for integration of a coolant channel through or in proximity to a bearing assembly 28, for transferring information such as a temperature sensor signal through or in proximity to bearing assembly 28, and/or for implementing/accommodating various other structure. For example, a hole (not shown) may be formed through an otherwise continuous annular structure of axially extending portion 203. Structural portions may be thermally matched, for example by having components with a same or similar coefficient of thermal expansion.

Bearing assemblies 26, 28 may include self-aligning bearings, ball bearings, journal bearings, magnetic bearings, hybrid devices, and others. Alignment of bearing assemblies may be controlled back to a common datum structure. For example, bearing assembly 28 may be machined in position relative to a register diameter (e.g., inside diameter (ID)) in front of a machine's inner housing. In such a case, a bearing carrier is pressed into the register diameter. Press fit conditions and tolerances are tightly controlled. Bearing assemblies 26, 28 and corresponding support structure, such as axially extending housing portions 24, 203, may be formed of a non-electrically conductive material to act as insulators against eddy currents that may otherwise lower machine efficiency. For example, bearing assemblies and bearing supports may conduct magnetic flux and/or voltage that may result in damage or reduced performance; to prevent such an occurrence, current insulated bearings may be used, including hybrid bearings with ceramic rolling elements and inner or outer rings coated with oxide ceramics.

Bearing assemblies 26, 28 and corresponding support structure may include additional components (not shown) such as washers, snap rings, and others, for maintaining radial alignment of bearing assemblies 26, 28 relative to stator assembly 2 and housing sections 11, 13. A chosen type of bearing for a given application may require use of such additional structure for dampening and noise reduction, for cooling, for lubrication, for heat transfer, for strength, and for other purposes. Bearing assemblies 26, 28 may include bearing carriers, shock/vibration cushioning structure such as rubber washers, axially elongated bushings and spacers, coolant cavities, elastic supports, coolant seals and fittings, and other apparatus.

An annular sensor wheel 227 is secured to shaft 17 and a corresponding annular sensor pickup 228 is positioned to detect movement of sensor wheel 227. For example, wheel 227 may contain elements such as coil(s), magnet(s) or teeth (not shown) that may be detected by a transformer, Hall effect device, or other circuit. Together, wheel 227 and pickup 228 may form a resolver system that outputs an electrical angle θ corresponding to a detected mechanical angle of shaft 17. Information obtained by such resolver system may be used, for example in cooperation with an engine management unit (EMU) or other ancillary circuitry, to determine shaft speed, torque, phase, and various other parameters related to control of electric machine 10. Control functions may be optimized to increase operational efficiency of electric machine 10 and/or to increase safety and efficiency of a host vehicle. In various embodiments, a system including wheel 227 and detector 228 may be formed as a rotary/pulse encoder and decoder, or a phase/speed detector system may include a resolver-to-digital converter. Electrical connections (not shown) to/from pickup 228 may be incorporated into an annular conduit 229 and/or fed through cover 19. Fluid connections (if applicable) may be contained in an axial end space 230 and/or within an annular recess space 231.

Figure 5A:
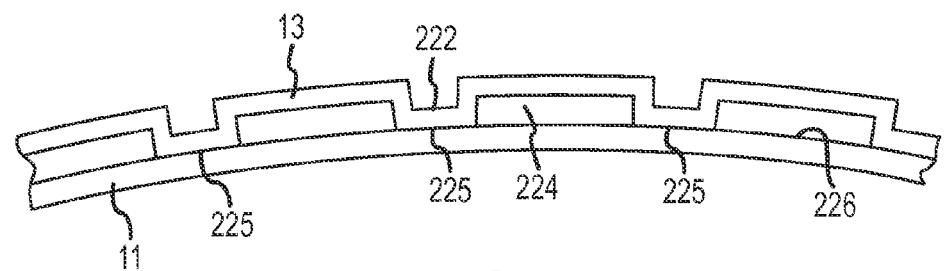
FIG. 5A is a partial schematic elevation view and FIG. 5B is a top schematic view of an S-shaped coolant path formed by stamping the axial end of a housing section, according to an exemplary embodiment.
Figure 5B:
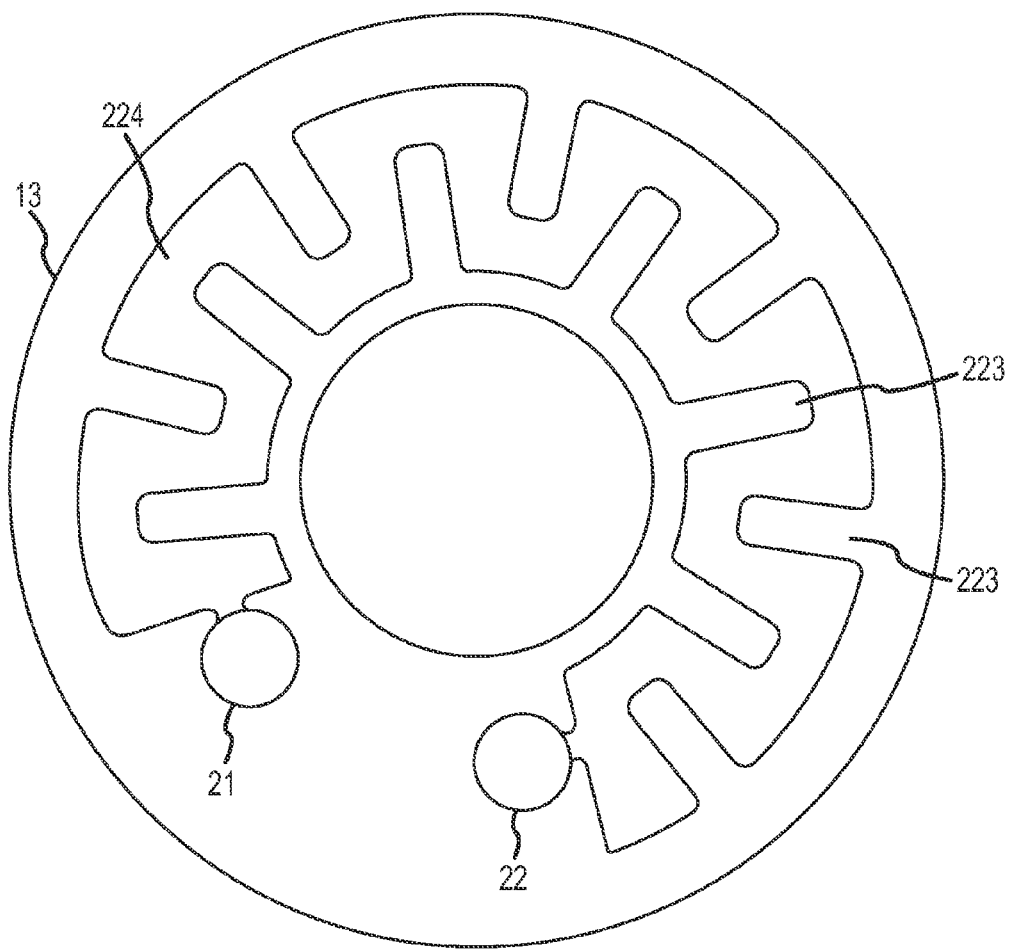

FIG. 5A is a partial schematic elevation view and FIG. 5B is a top schematic view of an S-shaped coolant path formed by stamping the axial end of housing section 13, according to an exemplary embodiment. Embossments 222 are formed as stamped features that form baffles 223 in a coolant channel 224 that forms an S shape as it extends circumferentially around the axial end of housing section 13. For example, embossments 222 may be formed so that axially inward surfaces 225 of housing section 13 are attached to axially outward surface 226 of housing section 11, such as by resistance welding or other process. In the illustrated example, coolant channel 224 is a serial fluid channel between coolant inlet 21 and outlet 22. However, coolant channel 224 may be formed in any appropriate serial/parallel configuration by being joined to other coolant channels, such as a stator cooling jacket, serpentine cooling insert, or other coolant passageway.

With reference to FIG. 4B, a thermal interface material (TIM) 32 having a high thermal conductivity may be applied between surfaces 29, 31 and/or between surfaces 33, 34 to reduce thermal resistance therebetween and thereby improve operational efficiency. TIM 32 may be formulated as an adhesive, as a grease, and/or as a tape for bonding power electronics 30 to cover surface 29 and/or to housing surface 33. In an exemplary alternative embodiment, TIM 32 is applied to housing surface 33; power electronics 30 are then positioned and assembled onto end surface 33 of housing 13 prior to making all necessary electrical connections between power electronics 30 and electric machine 10. For example, TIM 32 may be applied between housing end surface 33 and a heat transfer surface 34 of power electronics 30; after assembling, connecting, and mounting electronics 30 to surface 33, rear cover 19 is then installed. In another exemplary embodiment, TIM 32 is applied to surfaces 33, 34 prior to placing power electronics 30 onto housing surface 33. For example, TIM 32 applied to heat transfer surface 34 may be formulated as a quick-cure adhesive and TIM 32 applied to electronics surface 31 may be formulated as a grease, so that power electronics 30 is securely bonded to housing 13 but only has a thermal bond with cover 19. Regardless of the chosen application method, TIM 32 may be applied between power electronics 30 and cooling channel/jacket 35, thereby improving heat transfer from power electronics 30 to the coolant flow and maximizing operational efficiency of electric machine 10.

TIM 32 may have a thermal conductivity of 1 to 20 W/m·K, a thickness of 0.002 to 3.5 mm, and a maximum temperature rating of 200° to over 350° C. The TIM may be used without a hardener and associated curing, or a hardener may be mixed with the TIM before applying it. For example, TIM 32 may be a non-curable liquid having a paste-like consistency, or it may contain epoxy or another adhesive with a short curing time. The viscosity of TIM 32 may be adjusted to optimize flow and removal of air during assembly. When the TIM application process is optimized, a thin layer of TIM fills air gaps created by surface irregularities, so that substantially all air is removed from a corresponding interface and is replaced with TIM. The application of TIM greatly reduces thermal resistance and thereby improves thermal transfer between power electronics 30 and housing 13/cooling jacket 35. In particular, air gaps within power electronics 30 and at interfaces between surfaces 29, 31 and/or between surfaces 33, 34 are removed. By reducing the thermal resistance within power electronics 30 and at its thermal interfaces, additional heat can be dissipated from an electric machine 10, which can operate at a cooler temperature.

Subsequent processing may include removing excess TIM that has been squeezed out of the interfaces, at least partially curing the TIM, and/or applying sealant at edges of TIM thermal interfaces. For example, certain TIM compositions having a high thermal conductivity do not cure, but remain in a semi-liquid state as a paste. To prevent migration of such TIM over time, for example due to vibration, a bead of epoxy or other sealant may be provided at lateral edges of the TIM. For example, an exposed bead may result from excess TIM being pushed out of thermal interfaces by an assembly process. When the TIM does not fully cure, or when reliability may be affected by centrifugal forces pushing the TIM radially outward over time, any excess TIM is removed and a curable epoxy or the like may then be applied for sealing the TIM inside thermal interfaces. Seals may alternatively include O-rings, gaskets, resin, fiber, and/or structural barriers that block any exit paths out of thermal interfaces. In some applications, such sealing may be effected by use of a temporary gasket that is only required during the manufacturing process.

Some TIM may be partially or fully cured by being mixed with a hardener. Typically such curing takes approximately two hours at room temperature and approximately five minutes at an elevated temperature such as 100° C. When TIM has a high viscosity and no migration, the absence of thermal epoxies or other hardeners may reduce shrinkage and similar reliability issues. Depending on a particular application, TIM may contain silicone, alumina or other metal oxides, binding agents, epoxy, and/or other material. The TIM has a high thermal conductivity and a high thermal stability, and may be formulated to have minimal evaporation, hardening, melting, separation, migration, or loss of adhesion. Suitable materials are available from TIMTRONICS.

A biasing member 40 (e.g., FIG. 4B) may be placed between electronics surface 31 and cover surface 29. For example, biasing member 40 may be a conventional metal spring, one or more Belleville springs, one or more spring members having a semi-rigid component, an array of spring members, an O-ring, rubber or other flexible substance, a resilient deformable structure, or other structure, whereby power electronics 30 are axially pushed against housing surface 33. In an alternative embodiment, biasing member 40 may be a clamp structured for axially pulling power electronics 30 toward housing surface 33. In either case, the contact resistance between housing 13 and power electronics 30 is reduced by axially biasing respective surfaces 33, 34 toward one another. Biasing member 40 may be distributed in the circumferential, radial, and/or axial direction. For example, power electronics 30 may include any number of individual components having various corresponding lengths, widths, and heights. In such a case, the structure of biasing member 40 may be optimized for applying an even and consistent amount of axial force to the components.

Figure 6A:
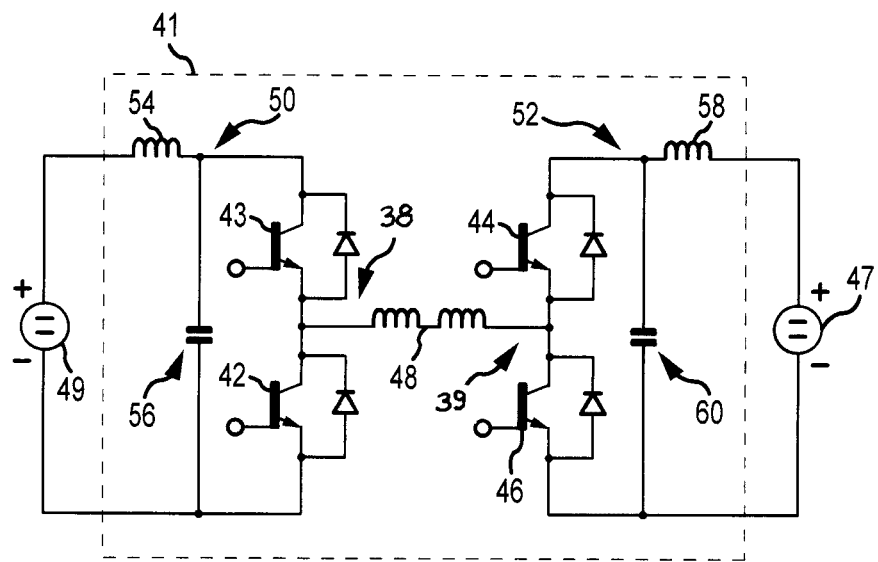
FIG. 6A is a schematic diagram of an exemplary DC/DC converter.

FIG. 6A is a schematic diagram of an exemplary DC/DC converter 41 that may form a part of power electronics 30. DC/DC converter 41 includes a power switching section with two dual insulated gate bipolar transistor (IGBT) legs 38, 39 each having two IGBTs 42 and 43, and 44 and 46, respectively. The two legs 38, 39 are interconnected at midpoints by a switching inductor (or switching inductors, as described below) 48 having an inductance. Converter 41 also includes a first filter 50 connected to the positive rail of the first IGBT leg 38 and a second filter 52 connected to the positive rail of the second IGBT leg 39. As shown, filters 50, 52 include a first inductor 54, a first capacitor 56, a second inductor 58, and a second capacitor 60, respectively. DC/DC converter 41 may also include a controller (not shown) within associated vehicle electronics such as an engine control module (ECM). Power electronics 30 may also include one or more power modules (not shown) in a structure for mounting at housing end surface 33.

Figure 6B:
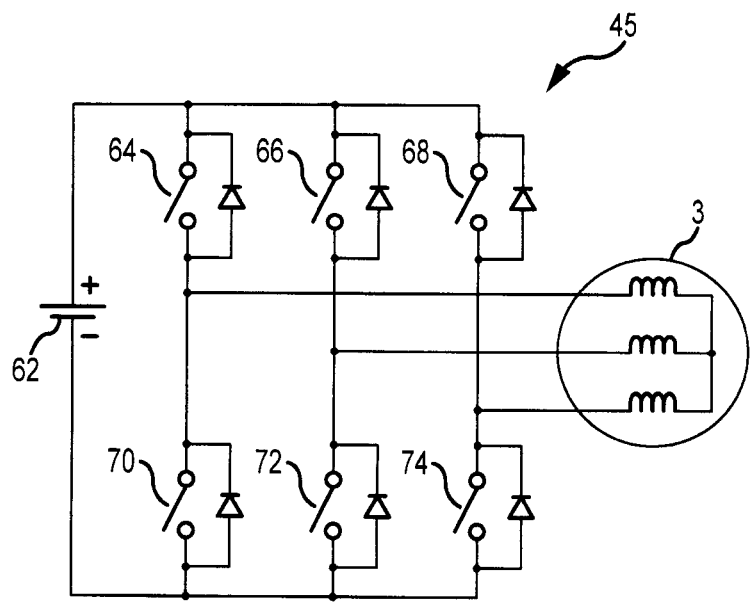
FIG. 6B is a schematic diagram of an exemplary DC/AC inverter.

FIG. 6B is a schematic diagram of an exemplary DC/AC inverter 45. Inverter 45 includes a three-phase circuit coupled to stator coils 3. Inverter 45 includes a switch network having a first input coupled to a voltage source 62 (e.g., a battery 47 and/or an output 49 of DC/DC converter 41). Although a single voltage source is shown, a distributed direct current (DC) link with two series voltage sources or other configuration may be used. The switch network comprises three pairs of series switches (e.g., IGBTs) with antiparallel diodes (i.e., antiparallel to each switch) corresponding to each of the phases. Each of the pairs of series switches comprises a first switch, or transistor, (i.e., a "high" switch) 64, 66, and 68 having a first terminal coupled to a positive electrode of the voltage source 62 and a second switch (i.e., a "low" switch) 70, 72, and 74 having a second terminal coupled to a negative electrode of the voltage source 62 and having a first terminal coupled to a second terminal of the respective first switch 64, 66, and 68. DC/DC converter 41 and inverter 45 may also include a plurality of power module devices, each including a semiconductor substrate or electronic die with an integrated circuit formed thereon. In operation, power electronics 30 must be kept below a temperature of 125° C., whereas other components of electric machine 10 (e.g., stator windings 3) may be able to withstand temperatures of 200° C. or more. Power electronics 30 may be distributed in a circumferential, radial, and/or axial direction, and may interface with various sensors and automotive control modules, or ECMs, such as a controller for DC/DC converter 41, an inverter control module, a vehicle controller, and other ancillary devices and components. For example, temperature or rotational speed sensors may be adapted to occupy a same general location at an axial end of electric machine 10. In another example, any of power electronics components, stator ID cooling channels, gear reduction systems, clutches, and other structure may be placed in otherwise unused spaces such as the axially extending space surrounding the respective circumferential perimeters of bearing assemblies 26, 28 (e.g., FIG. 4A).

Figure 7:
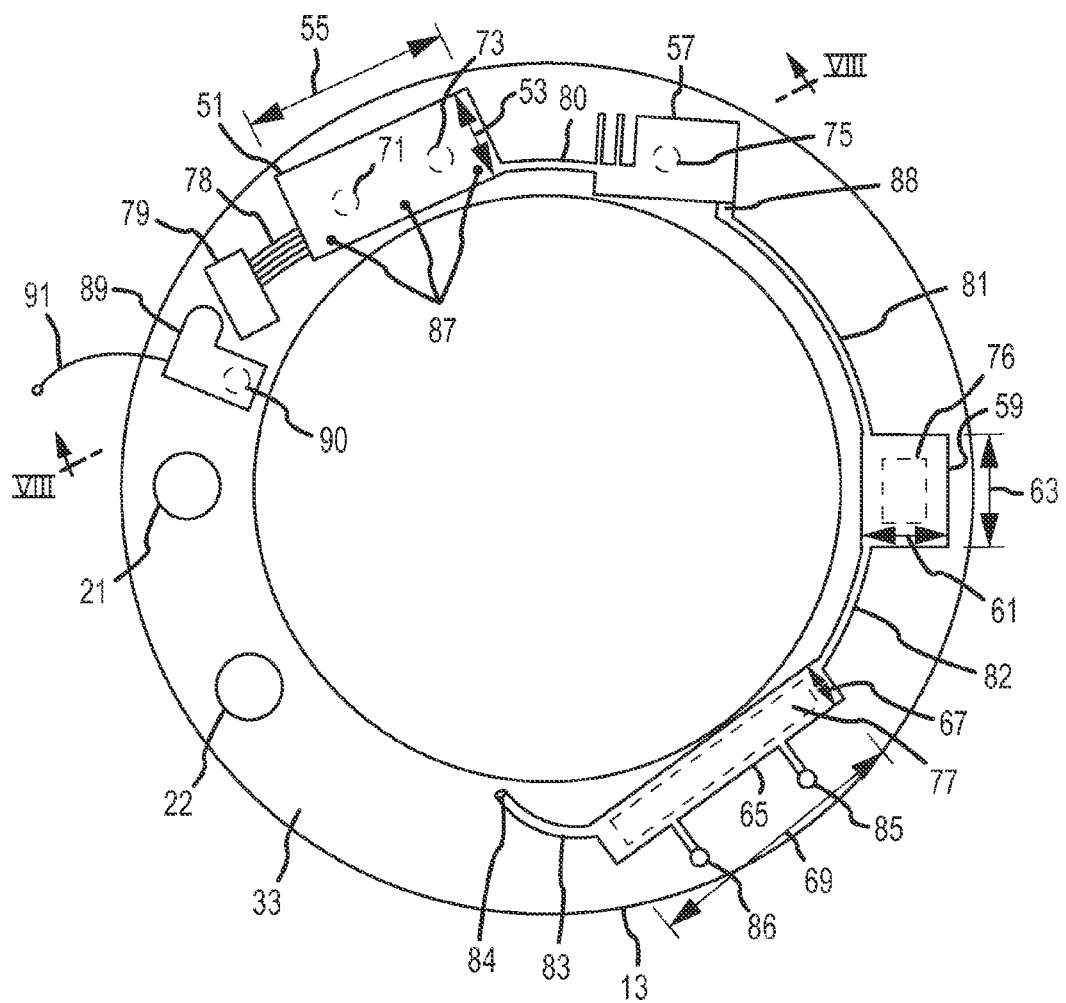
FIG. 7 is a schematic top view of power electronics distributed on an axial end of an electronic machine, according to an exemplary embodiment.

FIG. 7 is a schematic top view of power electronics distributed on an axial end of an electronic machine, according to an exemplary embodiment. Axial end surface 33 of housing 13 may be substantially planar to provide a single flat mounting surface for various components of power electronics 30, or surface 33 may be formed with any number of individual component mounting surfaces each having a particular shape, axial height, radial width, and circumferential length. In the illustrated example, power electronics 30 include a first module 51 having a width 53 and a length 55, a second module 57 having an irregular shape, a third module 59 having a width 61 and a length 63, and a fourth module 65 having a width 67 and a length 69. Fluid inlet 21 and fluid outlet 22 pass through axial end surface 33. Modules 51, 57, 59, 65 have axial biasing locations that engage biasing members 40 (FIG. 4B). For example, module 51 has spring engagement locations 71, 73 adapted for being coupled to a spring member such as a conventional metal coil spring or leaf spring. Module 57 also has a spring engagement location 75. Module 59 has an axial biasing location 76 adapted for receiving a spring-loaded plate that evenly distributes axial biasing force so that module 59 has a corresponding uniform heat distribution. Module 65 has an axial biasing location 77 adapted for engaging a relatively long biasing member 40 such as a narrow strip of rubber. Module 51 interconnects with a multiple conductor wire assembly 78 for receiving and sending respective input and output electrical signals and for implementing electrical power connections. Wire assembly 78 may include one or more electrical connectors 79 for electrical connection to external devices such as a battery 47 (FIG. 6A). Module 51 and module 57 are electrically connected by an interconnect 80, module 57 and module 59 are electrically connected to one another via an interconnect 81, and module 59 is electrically connected to module 65 via interconnect 82. Interconnects 80-82 may each have any number of individual conductors respectively sized for passing a predetermined amount of current therethrough. For example, an individual conductor passing a small level signal may be implemented as part of a printed circuit board (PCB), and a high power conductor may be implemented as a suitable AWG copper wire or metal bar. Common materials having suitable temperature and reliability characteristics may be used for forming a PCB and, typically, type FR-4 or ceramic based materials are preferred. Any of modules 51, 57, 59, 65 may include electrical conductors oriented to pass axially through housing surface 33. For example, module 65 may include a metal bar type connector 83 that passes through surface 33 via a feed-through hole 84, and may pass any number of other conductors to an axially inner side of housing 13 via feed-through holes 85, 86. Module 51 is positioned directly on top of three feed-through holes 87 allowing, for example, leads of individual electronic components to pass directly through surface 33 without being attached to a separate conductor. Any of modules 51, 57, 59, 65 may be electrically connected to ancillary components/modules 88 that are physically independent of axial biasing. Similarly, any number of electrically independent components/modules 89 may be axially biased and contained within space provided along housing surface 33. For example, module 89 may be a thermocouple having an axial biasing location 90 and an electrical cable 91.

Figure 8:
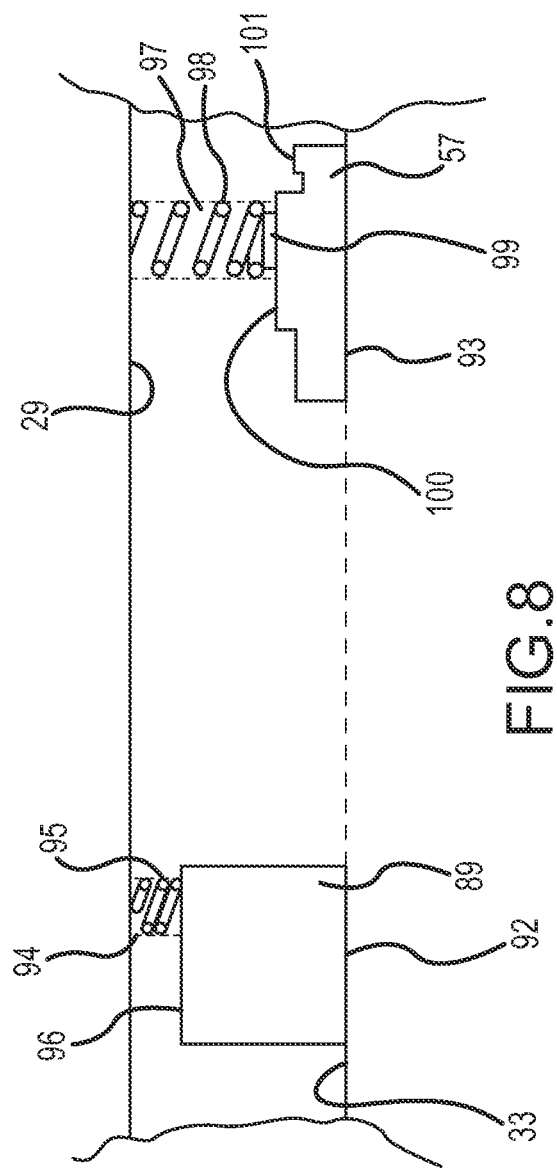
FIG. 8 is a schematic elevation view taken along the line VIII-VIII of FIG. 7.

FIG. 8 is a schematic elevation view taken along the line VIII-VIII of FIG. 7. Electronics module 89 and electronics module 57 have respective heat transfer surfaces 92, 93 placed onto housing surface 33, either directly or with a layer of TIM interposed therebetween. Axial biasing space 94 contains a conventional metal coil spring 95 having opposite axial ends respectively engaged with inner end cover surface 29 and with an axially outward biasing surface 96 of module 89. Axial biasing space 97 contains a conventional metal coil spring 98 having opposite axial ends respectively engaged with inner end cover surface 29 and with a plate 99 adapted for being coupled to spring 98. Plate 99 couples spring 98 to an axially outward biasing surface 100 of module 57. Module 57 has surfaces such as surface 101 with various axial heights, and such surfaces may each have any number of axial biasing locations.

Figure 9:
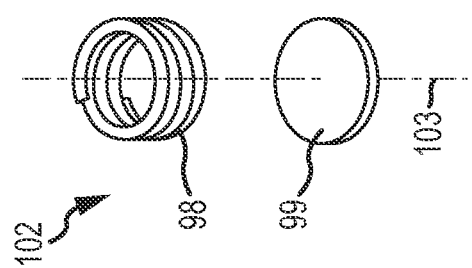
FIG. 9 is a schematic perspective view of an exemplary spring assembly.

FIG. 9 is a schematic perspective view of an exemplary spring assembly 102. A conventional metal coil spring 98 is mated to a plate 99 so that spring assembly 102 may provide biasing in an axial direction 103. In any embodiment, spring 98 or other biasing member may be secured to an axial end of housing 13 or to any other structure by embossing a feature that allows spring 98 to nest into its proper position. Alternatively, spring 98 may be soldered or brazed in place.

Figure 10:
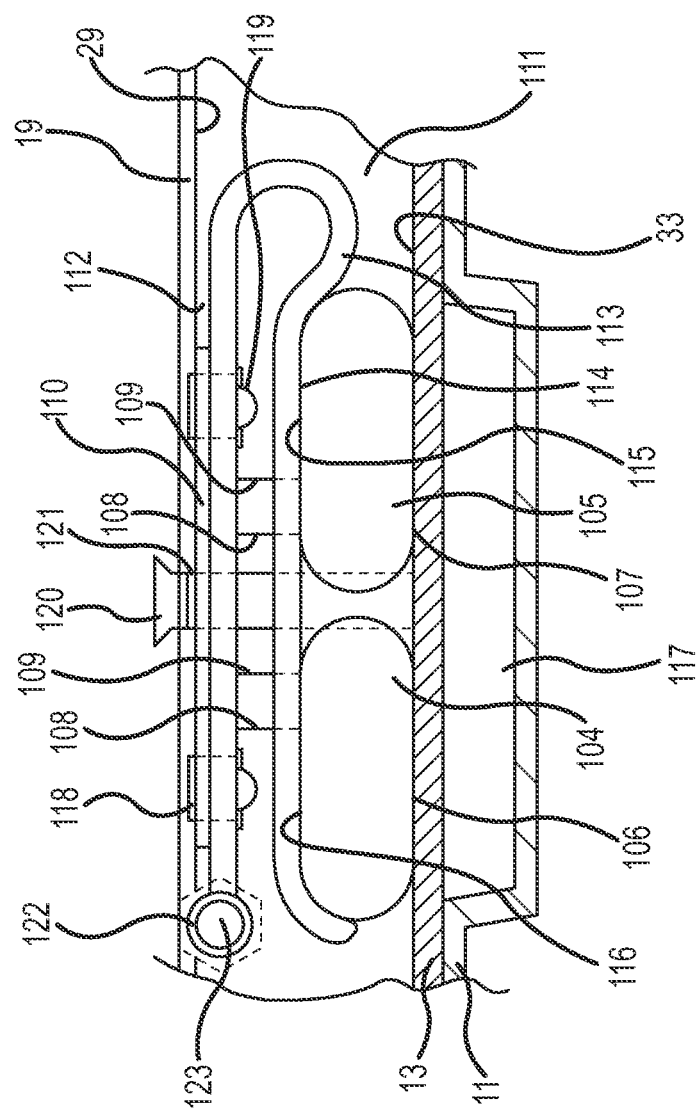
FIG. 10 is a schematic elevation view of electronic components being axially biased against a housing axial end surface, according to an exemplary embodiment.

FIG. 10 is a schematic elevation view of electronic components being axially biased against a housing axial end surface, according to an exemplary embodiment. Power electronics modules 104, 105 each have two component leads 108, 109 extending axially away from the respective component bodies. Leads 108, 109 may terminate in a substrate 110 or they may be electrically connected to other components of power electronics 30 by another route such as in an enclosed space 111 within cover 19. When PCB 110 is used, spacers (not shown) or other structure may be provided in an intermediate space 112 for assuring that electrical conductors of substrate 110 do not become shorted to axially inward cover surface 29. Components of modules 104, 105 may include one or more passive devices such as inductors, high-temperature capacitors, and/or resistors, and one or more active devices such as diodes and transistors. A module component may generate heat and/or may require cooling to operate correctly and avoid heat-related damage such as that caused by melting. A leaf spring 113 has a biasing surface 114 that axially presses against modules' surfaces 115, 116. Modules 104, 105 have corresponding heat transfer surfaces 106, 107 that are thereby biased against housing axial end surface 33. The interface between housing sections 11, 13 has contiguous and sealed portions surrounding fluid channel portions 117. For example, fluid channels 117 may be formed between the sheet metal of sections 11, 13 in locations that underlie power electronics components such as modules 104, 105. As a result, thermal resistance between heat transfer surfaces 106, 107 and fluid channel 117 is reduced by the spring biasing of surfaces 106, 107 against housing surface 33, so that transfer of heat between modules 104, 105 and coolant passage 117 is improved. Leaf spring 113 may be secured to cover 19 by one or more attachment devices 118. For example, attachment device(s) 118 may include a rivet or other structure having an attachment portion 119 that engages spring 113, such as by metal-to-metal mating structure (e.g., washer having prongs), by separate spring structure such as a conical or Belleville type spring/washer, by compression attachment such as riveting, by a locking structure such as a key, or by other structure. A biasing adjustment device 120 such as a bolt or other structure may be provided for axial adjustment of tensioning force being exerted onto modules 105, 106. For example, adjustment device 120 may be threaded into an insulated nut 121 that is forced axially inward when adjustment device 120 is tightened. The axially inward placement of nut 121 increases the axial force of spring 113 and the corresponding urging of module surfaces 106, 107 against the cooling jacket formed by the portion of housing 13 that encloses channel 117. A lateral securement member 122 may be formed as a part of cover 19 and/or as an integral portion of leaf spring 113. For example, lateral securement member 122 may include a bore 123 structured for allowing an insertion machine to grasp or otherwise handle leaf spring 113 for placement thereof, and lateral securement member 122 may also be structured for receiving a retaining rod (not shown) or other part of an adjacent mating structure, thereby providing additional fixing of spring 113 to cover 19.

Figure 11:
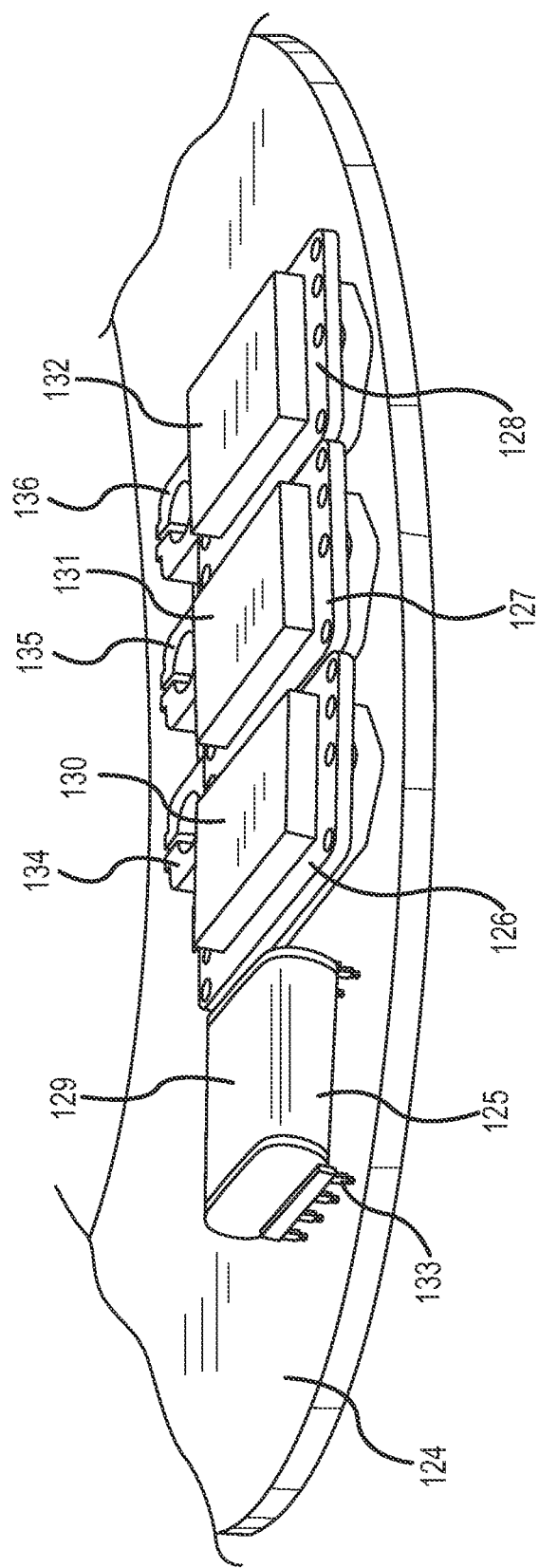
FIG. 11 is a partial perspective view of power electronics components mounted to a substrate 124, according to an exemplary embodiment.

FIG. 11 is a partial perspective view of power electronics components mounted to a substrate 124, according to an exemplary embodiment. Power electronic components include a capacitor 125 and transistors 126, 127, 128. Substrate 124 may be a printed circuit board having a curved shape and a width that permits installation of substrate 124 within cover 19 (FIG. 4B). Capacitor 125 has a heat transfer surface 129, and transistors 126, 127, 128 have respective heat transfer surfaces 130, 131, 132, with corresponding heat sink structure. In an exemplary embodiment, heat transfer surfaces 129, 130, 131, 132 are substantially coplanar, whereby when loaded substrate 124 is mounted onto housing end surface 33, heat transfer surfaces 129, 130, 131, 132 are flush with housing surface 33 either directly or with a layer of TIM interposed therebetween. Component heights may be adjusted using spacers 133. Substrate 124 may have electronic components mounted on both sides thereof, and it may include any number of through holes for passing a conductor or component mounting structure therethrough. Cable connectors 134, 135, 136 are fixedly mounted on substrate 124 and respectively receive and terminate electrical conductors therein. Such electrical conductors may pass through substrate 124. In an exemplary embodiment, components 125, 126, 127, 128 and connectors 134, 135, 136 are installed into substrate 124. Cables (not shown) are fed through holes in end cover 19 and secured to connectors 134, 135, 136, and then heat transfer surfaces 129, 130, 131, 132 are coated with TIM and positioned on housing end surface 33. A number of springs are affixed to axially inner surface 29 of cover 19, and cover 19 is secured to housing section 13 with bolts 20 (FIG. 4B) that mate with corresponding nuts 137. As a result, the springs attached to cover 19 engage corresponding spring engagement locations (e.g., FIG. 7), including spring engagement locations on the underside of substrate 124, whereby heat transfer surfaces 129, 130, 131, 132 are axially biased against housing surface 33.

Figure 12:
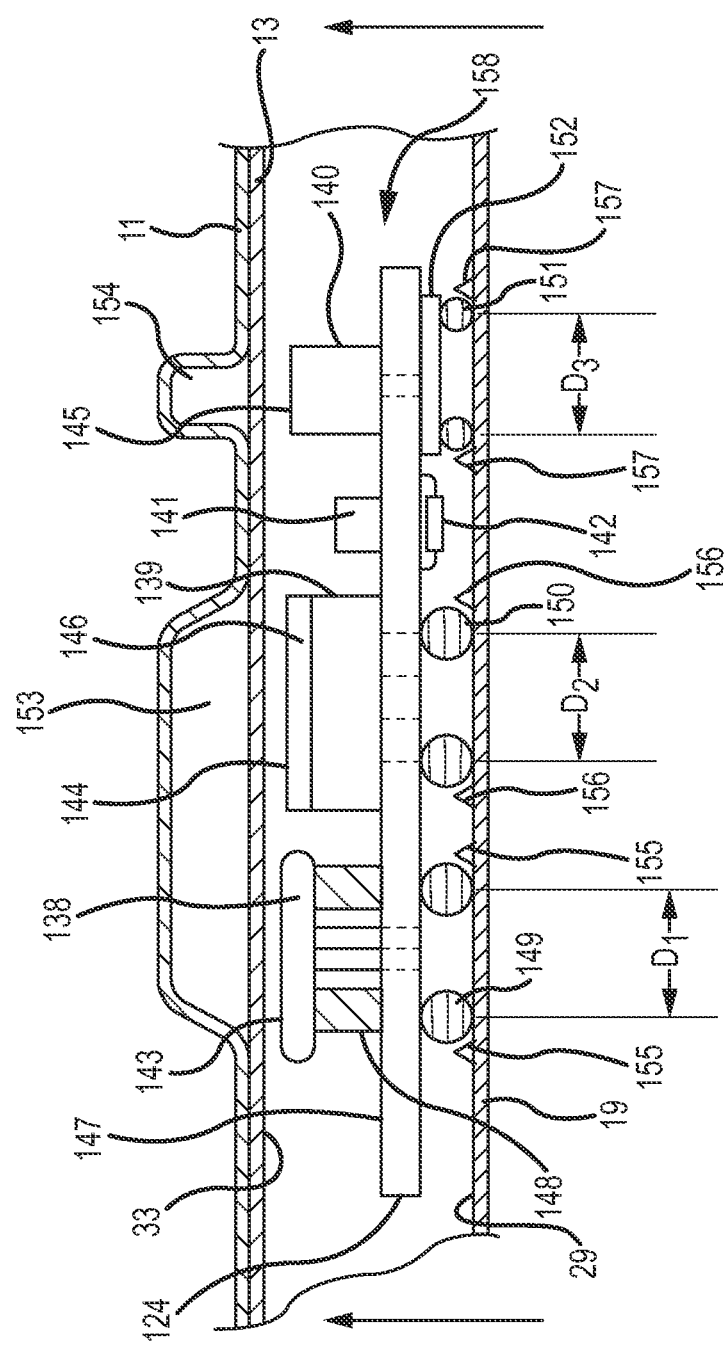
FIG. 12 is a partial schematic elevation view of power electronics components being axially biased against an axial end cooling jacket by a number of O-rings, according to an exemplary embodiment.

FIG. 12 is a partial schematic elevation view of power electronics components being axially biased against an axial end cooling jacket by a number of O-rings, according to an exemplary embodiment. Electronic components including power electronics modules 138, 139, 140 and peripheral components 141, 142 are mounted on a substrate 124. For example, peripheral components 141, 142 may include electronics and/or connectors that do not require a high degree of heat transfer. Power electronics modules 138, 139, 140 have respective heat transfer surfaces 143, 144, 145 that are coplanar. Module 139 is coupled to or integrally formed with a heat sink 146. Module 138 is axially offset from the top surface 147 of substrate 124 with spacers 148, whereby heat transfer surface 143 is made to be coplanar with heat transfer surfaces 144, 145. Three O-rings 149, 150, 151 are placed on the axially outward side of substrate 124, underneath respective power electronics modules 138, 139, 140. A spacer 152 is provided between O-ring 151 and substrate 124 when the thickness or another dimension of O-ring 151 necessitates adding another layer. For example, when thickness of O-ring 151 is small because of the desirability of balancing the distribution of spring forces in the area of O-ring 151, it may be necessary to utilize different sized O-rings 151 and spacers 152 to provide a stable structure. O-ring 149 has a diameter D1, O-ring 150 has a diameter D2, and O-ring 151 has a diameter D3, the diameters D1, D2, D3 being chosen to provide spring force to axially urge power electronics modules 138, 139, 140 against housing axial end surface 33. Inner housing section 11 and outer housing section 13 are joined together in some overlapping areas, for example being sealingly coupled together by welding, brazing, use of adhesives and sealants, and by other structure. In specific locations adjacent power electronics components, inner housing section 11 and outer housing section 13 form coolant channels and chambers therebetween. For example, a coolant channel 153 and a coolant channel 154 are formed between housing sections 11, 13 to be respectively adjacent power electronics modules 138, 139, 140. End cover 19 may have O-ring positioning/retaining projections 155, 156, 157 formed on inner cover surface 29 for respectively retaining O-rings 149, 150, 151 during assembly. When cover 19 is secured to housing sections 11, 13, heat transfer surfaces 143, 144, 145 are contiguous with housing surface 33 and are axially urged against surface 33 by spring force created by the compression of O-rings 149, 150, 151. An electrically non-conductive material having a high thermal conductivity, such as thermally conductive potting compound, may be injected to fill spaces 158 between cover 19 and housing 13, thereby improving heat transfer. For example, the top of substrate 124 may be filled with potting material so that only heat transfer surfaces 143, 144, 145 are exposed, and space between substrate 124 and cover surface 29 may be masked off so that the added potting material does not affect the desired spring action.

Figure 13A:
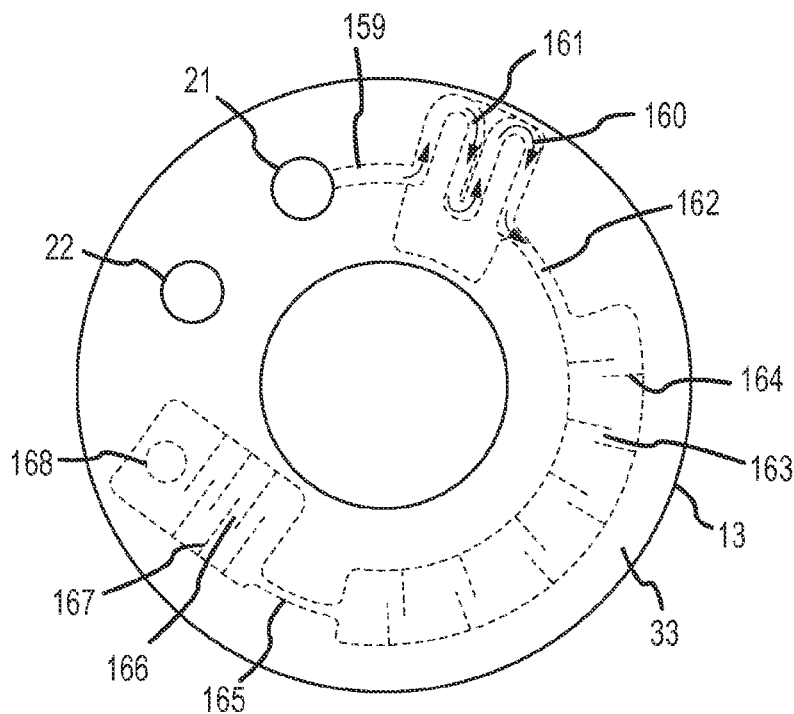
FIG. 13A is a schematic top view of housing axial end surface.
Figure 13B:
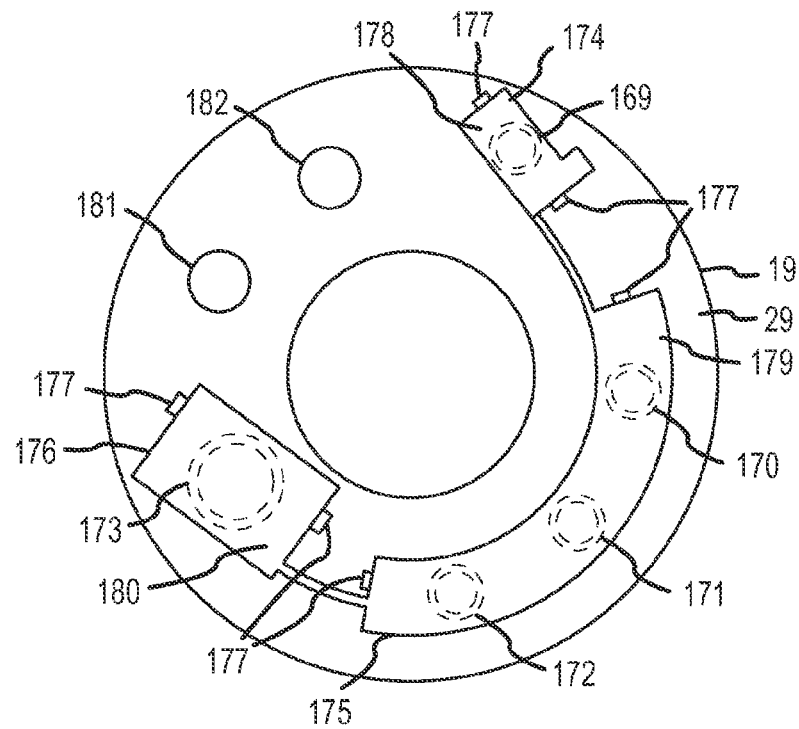
FIG. 13B is a schematic top view of the axially inner portion of an end cover, according to an exemplary embodiment.

FIG. 13A is a schematic top view of housing axial end surface 33, and FIG. 13B is a schematic top view of the axially inner portion of cover 19, according to an exemplary embodiment. Coolant inlet 21 receives coolant flow from an external source such as a heat exchanger (not shown). The coolant passes through channels and cavities formed between sheet metal housing sections 11, 13. An axial end, multiple section, baffled cooling jacket is thereby formed for cooling power electronics components contained within the axial end of electric motor/generator 1. A channel 159 transfers the coolant from inlet 21 to a chamber 160 having baffles 161 that guide the coolant in a predetermined path through chamber 160. The coolant passes from chamber 160 into a channel 162 that empties into a chamber 163 having baffles 164. Baffles 164 guide the coolant through an "S" shaped path that acts to maximize the transfer of heat by slowing the coolant flow. Chamber 163 passes the coolant to a chamber 166 via a channel 165 formed therebetween. Chamber 166 includes baffles 167 that circulate the coolant in an "S" pattern within chamber 166. The coolant exits chamber 166 through an outlet passage 168 that transfers the coolant to other portions of electric machine 1, for example to a stator cooling jacket and/or to a nozzle system for spraying conductor end turn portions of stator coils 3 (FIG. 1). In a typical system, the hot coolant is collected in a sump area (not shown) of electric machine 1 and may then be cooled in a heat exchanger such as an oil radiator before being returned to coolant inlet 21.

FIG. 13B schematically shows the inside of cover 19. O-rings 169, 170, 171, 172, 173 are placed onto inside cover surface 29 at predetermined locations. Power electronics modules 174, 175, 176 have respective heat transfer surfaces 178, 179, 180 and are interconnected, electrically connected, and attached to cover 19 by attachment members 177 structured to retain modules 174, 175, 176 without encumbering movement of O-rings 169, 170, 171, 172, 173 and without interfering with a coplanar contiguous engagement of heat transfer surfaces 178, 179, 180 with housing axial end surface 33. Holes 181, 182 are provided in the axial end of cover 19 for receiving coolant inlet 21 and coolant outlet 22, respectively, when cover 19 is placed onto and secured to housing section 13. Gaskets, fasteners, and other ancillary materials (not shown) may be provided on one or both of surfaces 29, 33, such as for sealing, securing, masking, or otherwise optimizing the engagement of cover 19 with housing section 13. By such assembly, O-rings 169, 170, 171, 172, 173 are compressed, whereby heat transfer surfaces 178, 179, 180 are axially pressed against housing axial end surface 33 by the spring force of such compression.

Figure 14:
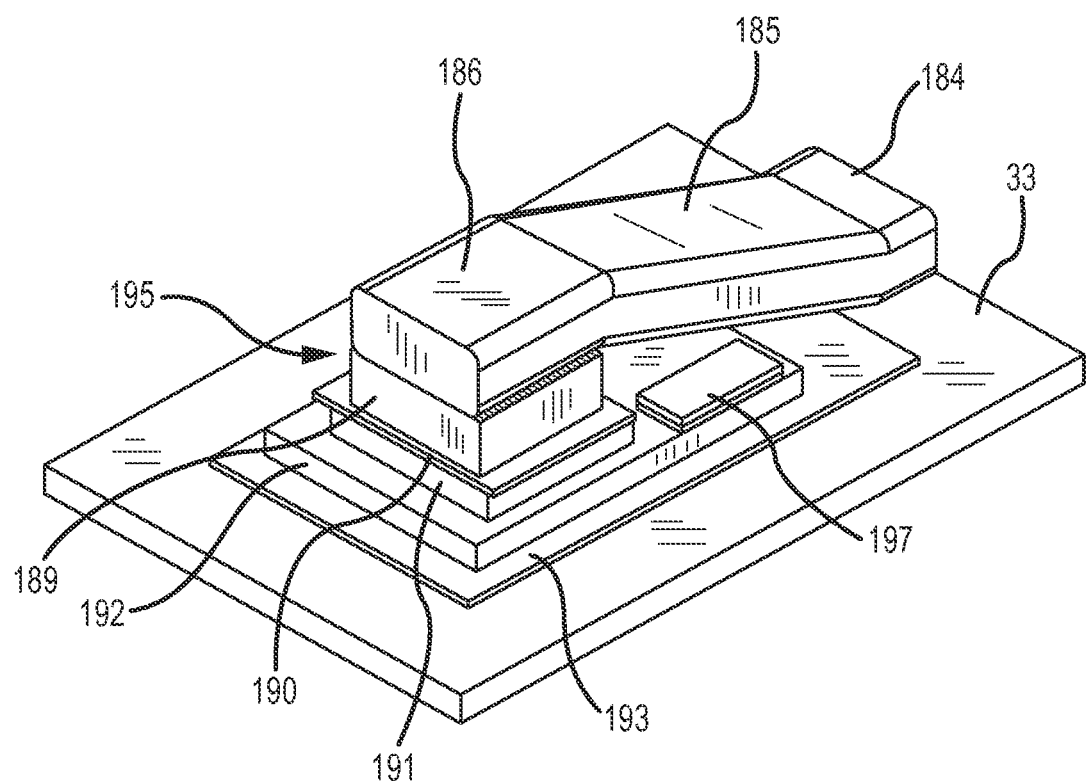
FIG. 14 is a perspective view and FIG. 15 is a schematic elevation view of a power electronics module being clamped to a housing axial end surface, according to an exemplary embodiment.
Figure 15:
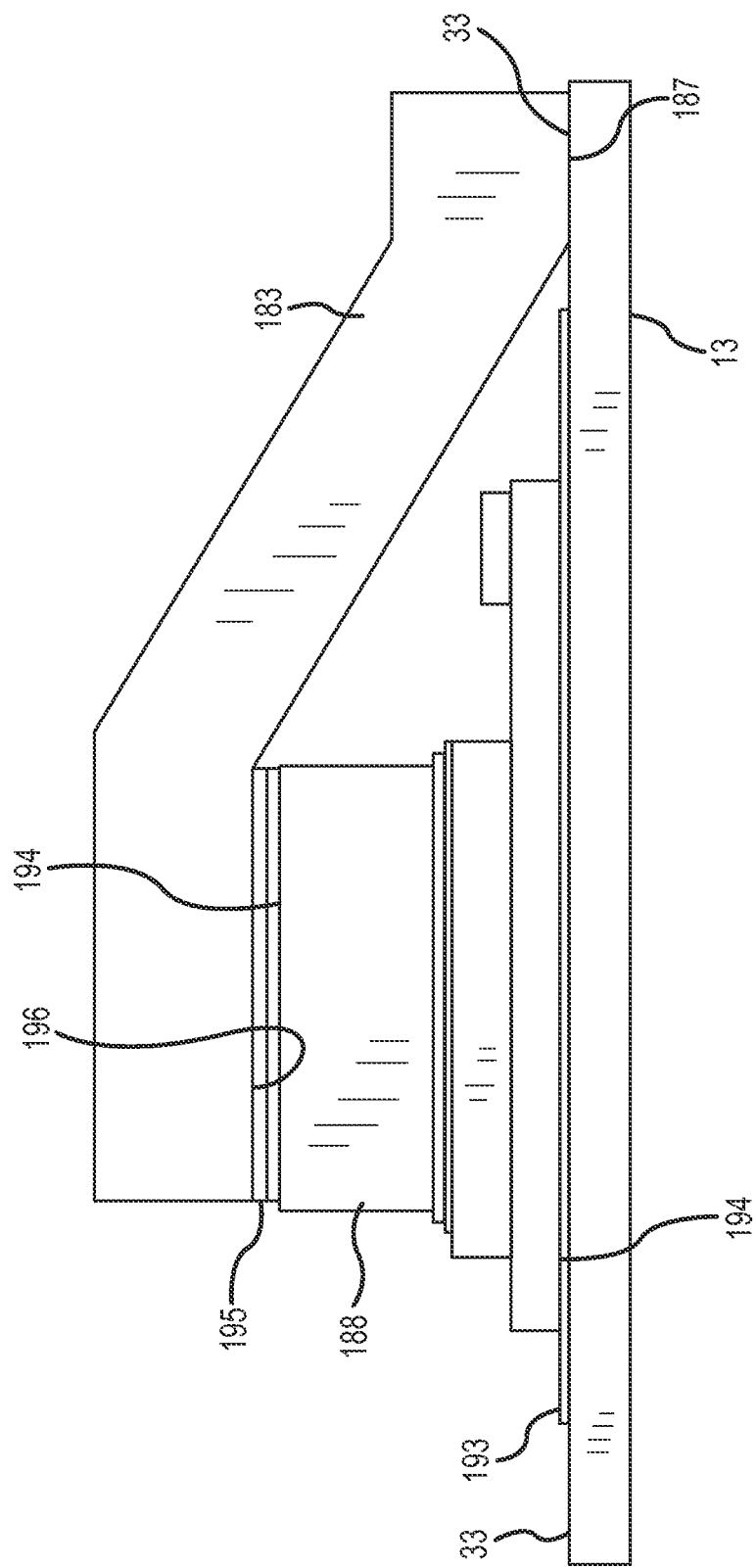

FIG. 14 is a perspective view and FIG. 15 is a schematic elevation view of a power electronics module being clamped to housing axial end surface 33, according to an exemplary embodiment. A clamp 183 has a base portion 184, an arm 185, and a biasing portion 186. Base portion 184 has an attachment surface 187 that is affixed to housing surface 33 such as by welding, brazing, adhesion, and/or by other process. A power electronics module 188 includes a spring receiving portion 189, a transfer plate 190, a heat generating portion 191, and a heat sink 192. An interface layer 193 may optionally be placed between heat transfer surface 194 of heat sink 192 and housing axial end surface 33. Interface layer 193 may include a mylar sheet for electrically insulating heat sink 192, and may include TIM or another heat transfer material. A spring 195 is placed between a spring receiving surface 194 of module 188 and an engagement surface 196 of clamp 183. For example, spring 195 may be a coil, leaf, elastomer, torsion, helical, snap, Belleville, or other type spring. Power electronics module 188 may include any number of components or other modules. For example, any number of ancillary components 197 such as connectors may be attached or otherwise incorporated into a module structure. When module 188 has been assembled and installed on surface 33, clamp 183 urges module against surface 33 with a spring force. For example, the assembly and installation may be performed while spring 195 is compressed, whereby the combined axial biasing force of clamp 183 and spring 195 urges module 188 against surface 33 and thereby lowers the thermal resistance therebetween.

The spring force being applied to power electronics components and/or modules may be determined by a spring's dimensions. For example, the length of a leaf spring or clamp may be proportional to the spring force, and changing the diameter and/or thickness of an O-ring may change the corresponding spring profile. The material of a given spring also affects the spring force. For example, the durometer hardness of an O-ring is proportional to its spring force.

Figure 16:
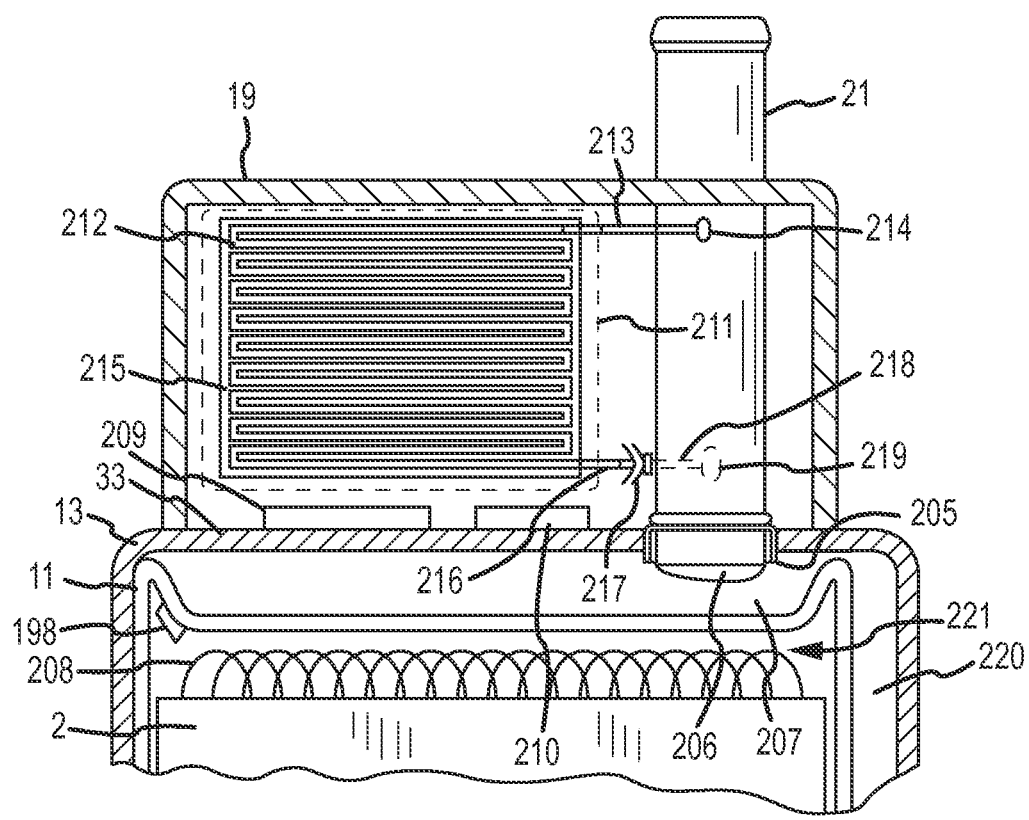
FIG. 16 is a cross-sectional schematic view of an integrated coolant system, according to an exemplary embodiment.

FIG. 16 is a cross-sectional schematic view of an integrated coolant system, according to an exemplary embodiment. Coolant inlet 21 extends through the space between cover 19 and housing section 13, and passes through housing section 13. A sealing member 205, for example a gasket, epoxy, rubber sleeve, or other structure, sealingly secures inlet 21 to housing section 13. Coolant fittings may be brazed or bolted into place. For example, brazing may be used to eliminate additional parts and space that would be required when using bolts. A coolant fitting may include a manifold. Coolant inlet 21 has an open end 206 where coolant flows into coolant channel 207 formed between housing section 11 and housing section 13. Coolant channel 207 may be formed to be proximate conductor end turns 208 projecting from stator 2. Coolant channel 207 is adjacent power electronics modules 209, 210 that are mounted to surface 33 of housing section 13. A cooling module 211 has a serpentine coil 212 formed of sub-miniature thermoplastic or rubber tubing, or formed by joining together injection molded high temperature plastic sheets. Coil 212 has an inlet tube 213 in fluid communication with coolant inlet 21. For example, inlet tube 213 may be sealingly joined to coolant inlet 21 at a molded connection 214. Cooling module 211 may be formed as a flexible structure having an adhesive for securing coil 212 to a surface of cover 19 and/or to a surface of a power electronics device 215 without the need for additional fasteners. Electronics device 215 may be oriented in any chosen manner and may have a heat transfer surface attached to serpentine coil 212 by adhesive or by another structure. Serpentine coil 212 may have a fluid outlet 216 configured as a connector. In such a case, fluid connector 216 may be structured for mating with a connector 217 attached to a coolant tube 218. In various configurations, coolant tube 218 may be attached to another cooling module, to a cooling channel formed between housing sections 11, 13, to a stator cooling jacket, to coolant outlet 22 (FIG. 3), or to a molded connection 219 of coolant inlet 21. When coolant outlet tube 218 is mated to fluid connector 219, cooling module 211 is thereby fluidly connected to the main coolant flow as a parallel tap, whereby coolant flow rate and volume through serpentine coil 212 is a fractional part that may be maintained by a diverting or channeling structure of inlet 214. Any number of parallel taps may be formed along coolant inlet 21. Any number of cooling modules 211 may be disposed within cover 19, in any series or parallel combination. For example, modules 211 may be joined together in a series string that is attached as a parallel tap. In an alternative embodiment, any cooling module 211 may be connected in series with cooling channel 207. Cooling channel 207 is fluidly connected to a coolant transfer passage 220 (FIG. 16). For example, coolant transfer passage 220 may transfer coolant to other portions of electric machine 1, such as to stator cooling jacket 200 (FIG. 4A). With reference to FIG. 3, baffles 233, 234 are embossed into housing 13. Baffle 233 extends axially along a portion of an exterior housing face and wraps around an axial end of electric machine 10, whereas baffle 234 does not wrap around the axial end. This alternating baffle pattern may be repeated around the circumference of machine 10. This alternating baffle pattern forces coolant to simultaneously flow in a serpentine path both around the circumference of machine 10 and across the axial end face. For example, coolant may flow out of opening 206, through coolant channel 207 across the axial end face in a radially outward direction, turn ninety degrees to flow axially toward the other axial end (front) of machine 10 in a coolant transfer passage 220, turn 180 degrees around a bend defined by an end of baffle 233, 234, flow in an axial direction back toward the coolant inlet end (rear) of machine 10 in a coolant transfer passage 220, turn ninety degrees to flow radially across the axial end face, turn 180 degrees to flow in an opposite direction across the axial end face, etc. A coolant path may thereby be optimized by implementing any axial and radial flow patterns in any series or parallel combination. A coolant path may include both modular cooling elements and coolant channels integrated into other machine structure.

In operation, coolant flow through cooling modules 211 removes heat from power electronics attached thereto. Many electronics components have a maximum temperature rating between 100° C. and 130° C. Coolant flow through coolant channel 207 removes heat from power electronics modules 209, 210 attached to surface 33 of housing section 13 and from any power electronics devices 198 attached to the inner side of coolant channel 207 along a surface of housing section 11. Coolant flow through coolant channel 207 also removes heat from adjacent stator coil end turns 208. For example, a conductive potting compound or other thermally conductive material may be placed in space 221 between end turns 208 and coolant channel 207 for improving the efficiency of heat transfer therebetween. Typically, the temperature of end turns 208 is much higher than the temperature of power electronics such as modules 209, 210 and devices 198, 215. Therefore, coolant that has been heated by power electronics is still at a temperature much lower than the temperature of end turns 208, so such coolant is effective in removing heat from end turns 208. Accordingly, coolant flow directed at removing heat of end turns 208 is typically downstream of other cooling events.

Any of the disclosed embodiments may be combined with any other embodiment, for a chosen application. For example, coolant channel(s) 35 formed between housing sections 11, 13 may be in fluid communication with further coolant routing via bearing assemblies 26, 28. In such a case, for example, a bearing assembly may include a fluid manifold and may transfer coolant between a non-rotating portion and a rotating portion, such as for flowing coolant to a rotor. In another example, baffles may be formed in a given section of a coolant path to effectively slow the coolant flow in proximity of power electronics components, and a downstream section of the coolant path may be formed without baffles and have a narrow diameter or cross-section to speed up and/or increase pressure of coolant flow entering a manifold. In a further example, a bearing assembly support structure formed of sheet metal may provide a surface for mounting power electronics components and/or springs, and may include a coolant flow path. In such a case, the coolant flow path may be formed in space between housing sections 11, 13, by axially extending outer housing section 13 in alignment with axially extending housing portion 203. Portion(s) of the power electronics components may thereby be cooled by a same coolant channel formed as part of a bearing assembly support structure. In various embodiments, power electronics may be secured in position with conventional structure such as an adhesive layer, such as when space requirements do not permit use of a biasing device. The electric machine may rotate in either the clockwise (CW) or counter-clockwise (CCW) direction. Coolant flow may be assisted by the rotation. Coolant flow may be partitioned and may include series and/or parallel paths. In various embodiments, a power electronics circuit may include peripheral devices such as circuitry for controlling coolant flow. Such may be combined with a physical partitioning of coolant flow. For example, coolant paths may be formed in modular fashion and/or having parallel taps for cooling individual electronics modules, and control thereof may regulate coolant flow to different locations based on operating temperature(s).

Although power electronics are herein described in various embodiments as being mounted as individual components that may be directly biased against a cooling or heat transfer surface, such components may alternatively be mounted collectively on plate(s) or substrate(s) (not shown) that are spring biased against a cooling jacket or other surface for removal of heat therefrom. In many cases, such plate or substrate may be made more readily adaptable for mating with a biasing device such as a spring, compared with a bare electronics component. As with the illustrated embodiments, TIM may be placed between a surface of the plate or substrate and the cooling jacket surface.

In various embodiments, power electronics components and other electronics may be mounted on both sides of a two-sided PCB, may be distributed at discrete locations and electrically interconnected, may be partitioned into components located both within and outside of an internal chamber defined by the housing, and/or they may be partitioned into components that source little or no heat and components requiring heat sinking with associated structure such as TIM and spring type biasing members. By distributing electronics components, packaging may be maximized while simultaneously maximizing heat rejection.

While various embodiments incorporating the present invention have been described in detail, further modifications and adaptations of the invention may occur to those skilled in the art. However, it is to be expressly understood that such modifications and adaptations are within the spirit and scope of the present invention.

What is claimed is:

1. An electric machine, comprising:
   a pair of substantially aligned sheet metal housing sections each including a substantially "L" shaped portion, at least one cooling channel being formed at an axial end of the electric machine between the two sections;
   a plurality of baffles defining the cooling channel and adapted to guide coolant flow through the cooling channel through a substantially S-shaped coolant flow path; and
   a plurality of power electronics components engaged with at least one of the housing sections adjacent the axial end cooling channel;
   wherein at least one of the plurality of baffles has an end defining a bend around which a coolant transfer passage between the housing sections is redirected approximately 180° between a first direction and a second direction.

2. The electric machine of claim 1, wherein at least one of the housing sections includes baffles that project towards the other housing section.

3. The electric machine of claim 1, wherein the power electronics components are disposed on both axial sides of the cooling channel.

4. The electric machine of claim 1, wherein the cooling channel includes a plurality of interconnected cavities.

5. The electric machine of claim 4, wherein the electronics components include at least one module having a heat transfer surface, and wherein the heat transfer surface is radially aligned with one of the cavities.

6. The electric machine of claim 1, further comprising a stator and a cooling jacket circumscribing the stator, wherein the cooling jacket is in fluid communication with the cooling channel.

7. The electric machine of claim 1, further comprising a thermal interface material (TIM) placed between the power electronics components and the at least one engaged housing section.

8. The electric machine of claim 1, wherein the first direction and the second direction are substantially radially oriented.

9. An electric machine, comprising:
   a stator;
   a pair of housing sections enclosing the stator;
   power electronics components positioned at an axial end of the electric machine for controlling operation of the electric machine;
   a coolant flow path that includes a power electronics cooling channel formed at the axial end between the housing sections; and
   a plurality of baffles adapted to guide coolant flow along the power electronics cooling channel through a substantially S-shaped portion of the coolant flow path;

wherein at least one of the plurality of baffles has an end defining a bend around which a coolant transfer passage between the housing sections is redirected approximately 180° between a first direction and a second direction.

10. The electric machine of claim 9, wherein the power electronics components are attached to opposite axial sides of the cooling channel.

11. The electric machine of claim 9, further comprising a thermal interface material (TIM) placed between the power electronics components and the cooling channel.

12. The electric machine of claim 9, further comprising a thermally conductive potting material enclosing the power electronics components.

13. The electric machine of claim 9, wherein the plurality of baffles is formed in at least one of the housing sections.

14. The electric machine of claim 13, wherein the baffles are embossed in the at least one housing section.

15. The electric machine of claim 9, wherein the electronics components and the cooling channel are correspondingly distributed circumferentially around the axial end and radially aligned with one another for transferring heat from the components to coolant guided through the cooling channel.

16. The electric machine of claim 9, wherein the first direction and the second direction are substantially radially oriented.

17. A method of cooling an electric machine, comprising:
   forming an axial end cooling channel between two sheet metal housing sections and defined by baffles that guide coolant through a substantially S-shaped coolant flow path;
   positioning a plurality of power electronics components at the axial end along the cooling channel;
   transferring heat from the electronics components to coolant guided through the substantially S-shaped coolant flow path; and
   redirecting approximately 180° between a first direction and a second direction coolant flow, along a coolant transfer passage between the housing sections, around a bend defined by a baffle end.

18. The method of claim 17, further comprising:
   providing a cooling jacket that circumscribes a stator of the electric machine; and
   fluidly connecting the cooling jacket with the axial end cooling channel.

19. The method of claim 17, further comprising interposing thermal interface material (TIM) between the power electronics components and the cooling channel.

20. The method of claim 19, wherein the TIM includes an adhesive, and wherein the positioning includes adhering the power electronics components to at least one of the housing sections with the TIM.

21. The method of claim 17, wherein the positioning of the power electronics components includes attaching the components to opposite axial sides of the cooling channel.

22. The method of claim 21, further comprising electrically interconnecting the components using at least one hole formed through both housing sections.

23. The method of claim 17, wherein the first direction and the second direction are substantially radially oriented.

* * * * *